(12) United States Patent
Ku et al.

(10) Patent No.: US 9,992,300 B2
(45) Date of Patent: Jun. 5, 2018

(54) METHOD OF ADAPTIVELY DEPLOYING CACHE POSITIONED AT SUBSCRIBER NETWORK, AND SYSTEM THEREFOR

(71) Applicant: Electronics and Telecommunications Research Institute, Daejeon (KR)

(72) Inventors: Tai Yeon Ku, Daejeon (KR); Jong Youl Park, Daejeon (KR); Young sik Chung, Daejeon (KR)

(*) Notice: Subject to any disclaimer, the term of this patent is extended or adjusted under 35 U.S.C. 154(b) by 286 days.

(21) Appl. No.: 14/631,283

(22) Filed: Feb. 25, 2015

(65) Prior Publication Data
US 2015/0341458 A1 Nov. 26, 2015

(30) Foreign Application Priority Data

May 20, 2014 (KR) .................. 10-2014-0060122

(51) Int. Cl.
| | |
|---|---|
| *G06F 15/167* | (2006.01) |
| *H04L 29/08* | (2006.01) |
| *H04L 12/911* | (2013.01) |
| *H04L 12/64* | (2006.01) |

(52) U.S. Cl.
CPC ........ *H04L 67/288* (2013.01); *H04L 12/6418* (2013.01); *H04L 47/783* (2013.01); *H04L 67/2842* (2013.01)

(58) Field of Classification Search
CPC . H04L 67/288; H04L 67/2842; H04L 47/783; H04L 12/6418
See application file for complete search history.

(56) References Cited

U.S. PATENT DOCUMENTS

| 7,873,609 B2 | 1/2011 | Kim et al. |
| 2005/0010653 A1* | 1/2005 | McCanne ............ H04L 69/329 709/219 |
| 2013/0086324 A1* | 4/2013 | Soundararajan .... G06F 12/0813 711/122 |
| 2013/0097277 A1 | 4/2013 | Kim |
| 2014/0136647 A1 | 5/2014 | Moon et al. |

FOREIGN PATENT DOCUMENTS

| KR | 10-2010-0048316 A | 3/2012 |
| KR | 10-2014-0062649 A | 5/2014 |

* cited by examiner

*Primary Examiner* — Chirag R Patel
*Assistant Examiner* — Rachel J Hackenberg

(57) ABSTRACT

Disclosed is an adaptive cache transformation architecture for a cache deployed forward to minimize duplicated transmission, by automatically storing content in a subscriber network area. The system for adaptively deploying a cache positioned at a subscriber network includes a cache service group configured to store all or a part of pieces of content serviced from one or more content providing apparatuses to one or more terminals and including a plurality of caches deployed at a subscriber network between the content providing apparatus and the terminal in a distributed manner, and a resource manager configured to transform a deployment structure of the plurality of caches forming the cache service group, based on at least one of an increase rate in the number of pieces of contents requested by the one or more terminals and a reutilization rate for each content.

10 Claims, 6 Drawing Sheets

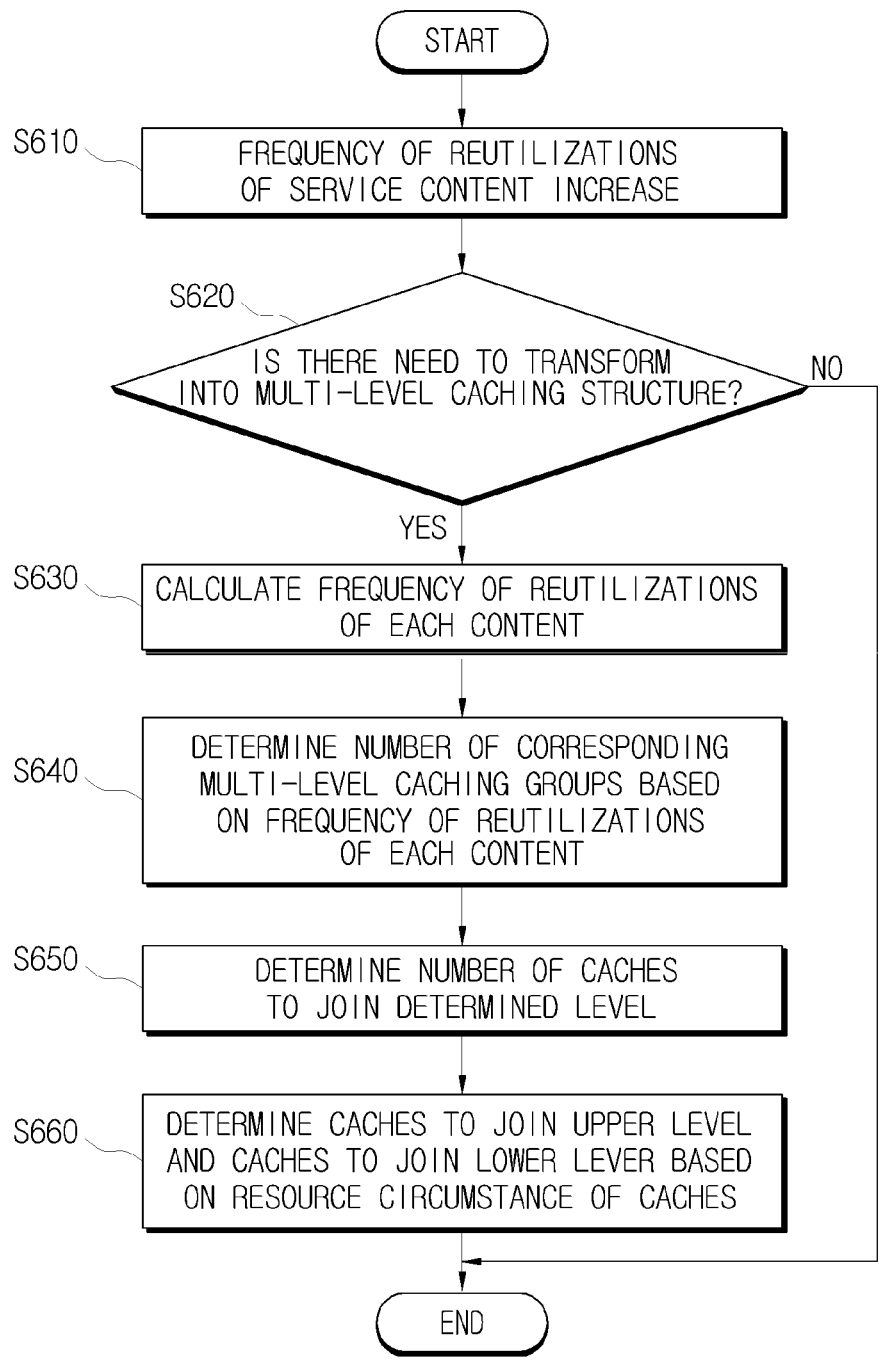

METHOD OF ADAPTIVELY DEPLOYING CACHE POSITIONED AT SUBSCRIBER NETWORK, AND SYSTEM THEREFOR

CROSS-REFERENCE TO RELATED APPLICATION

This application claims priority to and the benefit of Korean Patent Application No. 2014-0060122, filed on May 20, 2014, the disclosure of which is incorporated herein by reference in its entirety.

BACKGROUND

1. Field of the Invention

The present invention relates to a technology for reducing network traffic in a content delivery network, and more particularly, to an adaptive cache transformation architecture for caches deployed forward to minimize duplicated transmission, by automatically storing content in a subscriber network area.

2. Discussion of Related Art

In recent years, as smart phones having an improved performance are widely spread and content providers are rapidly increased based on the proliferation of smart phones, traffic of mobile communication networks is in the trend of getting increased. Therefore, speeds of web download and transmission of content, such as video, audio, image, and application are degraded and thus QoS is emerging as an issue In particular, with the development of content transmission technologies, a large capacity of file transmission becomes feasible in the online video services, such as Video On Demand (VOD) and Live Streaming, music streaming, file upload and file download, and accordingly, various services to transmit a large capacity of content are also provided.

However, in general, these content providing services have a tendency to provide duplicate content to a user in the same domain or the same wireless coverage in a varied frequency of duplicated transmissions though depending on the popularity, and according to the increasing use of the content providing services, such duplicate content occupies more and more portion of the network traffic.

The transmission of duplicate content further increases the traffic load of a communication network, and thus there has been an effort to reduce traffic by preventing the duplicated transmission, providing Contents Delivery network (CDN) services as a relevant technology. The CDN service is provided to stably deliver to user various pieces of content including video, such as movies and music video. In general, the CND service is implemented by storing pieces of content in a plurality of local caching devices deployed on a network in a distributed manner, and selecting the optimum cache server among a plurality of local cache servers through a load distribution device, such as a global load balance (GLB) server such that a requested content is transmitted to a terminal of a user through the selected cache server.

The CDN is implemented to reduce the instability issues occurring on the Internet, such as data loss, bottle neck, low transmission speed and data latency, based on the Internet network.

In the CDN service, the content caching technology is provided to selectively cache content in a plurality of local caching devices deployed on the network in a distributed manner. Such content caching needs to be performed in consideration of the size of a storage space of the local caching devices. In addition, there is a need to consider the time taken to determine whether content requested by a user matches cached content, and consider a cache hit rate that represents a percentage by which content requested by a user matches cached content.

In particular, as the paradigm of using a network has been shifted to focus on content, numerous studies have been conducted on the content centric transmission network worldwide. However, currently, the content delivery network market has been established based on the global network equipment companies and the Internet service providers, and thus only a few studies have been undertaken on a method of reducing network traffic through content analysis.

In addition, since the video content traffic is occupied by duplicated content, there is a need of a systematic traffic management plan through a software platform other than through network expansion.

SUMMARY OF THE INVENTION

The present invention is directed to a method of adaptively deploying a cache deployed at a subscriber network, capable of dynamically transforming a multi-level cache structure and a co-caching structure, in which a service is achieved by a plurality of caches in cooperation with each other, depending on the current network circumstance and the frequency of use of pieces of content.

Additional aspects of the invention will be set forth in part in the description which follows and, in part, will be obvious from the description, or may be learned by practice of the invention.

According to an aspect of the present invention, there is provided a system for adaptively deploying a cache positioned at a subscriber network, the system including a cache service group and a resource manager. The cache service group may be configured to store all or a part of pieces of content serviced from one or more content providing apparatuses to one or more terminals, and may include a plurality of caches deployed at a subscriber network between the content providing apparatus and the terminal in a distributed manner. The resource manager may be configured to transform a deployment structure of the plurality of caches forming the cache service group, based on at least one of an increase rate in the number of pieces of content requested by the one or more terminals and a reutilization rate for each content.

The resource manager may deploy the plurality of caches forming the cache service group in at least one of a multi-level structure and a co-caching structure.

The resource manager may deploy the plurality of caches forming the cache service group in a structure in which a multi-level structure is mixed with a co-caching structure.

The resource manager may determine a location at which each of the caches is deployed, in consideration of a storage capability and a network performance of each of the plurality of caches forming the cache service group.

The cache service group may include a parent cache group having a multi-level structure and an edge cache group having a co-caching structure, and the edge cache group may be connected to a lowest layer of the parent cache group.

The resource manager may transform, if the increase rate in the number of pieces of content requested by the one or more terminals is equal to or larger than a predetermined value, the cache service group from a multi-level structure to a co-caching structure.

The resource manager may transform, if the reutilization rate for each content is equal to or larger than a predetermined value, the cache service group from a co-caching structure to a multi-level structure.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 6 is a diagram illustrating a process of changing a cache service group from a co-caching structure to a multi-level structure in accordance with an exemplary embodiment of the present invention.

DETAILED DESCRIPTION OF EXEMPLARY EMBODIMENTS

Figure 1:
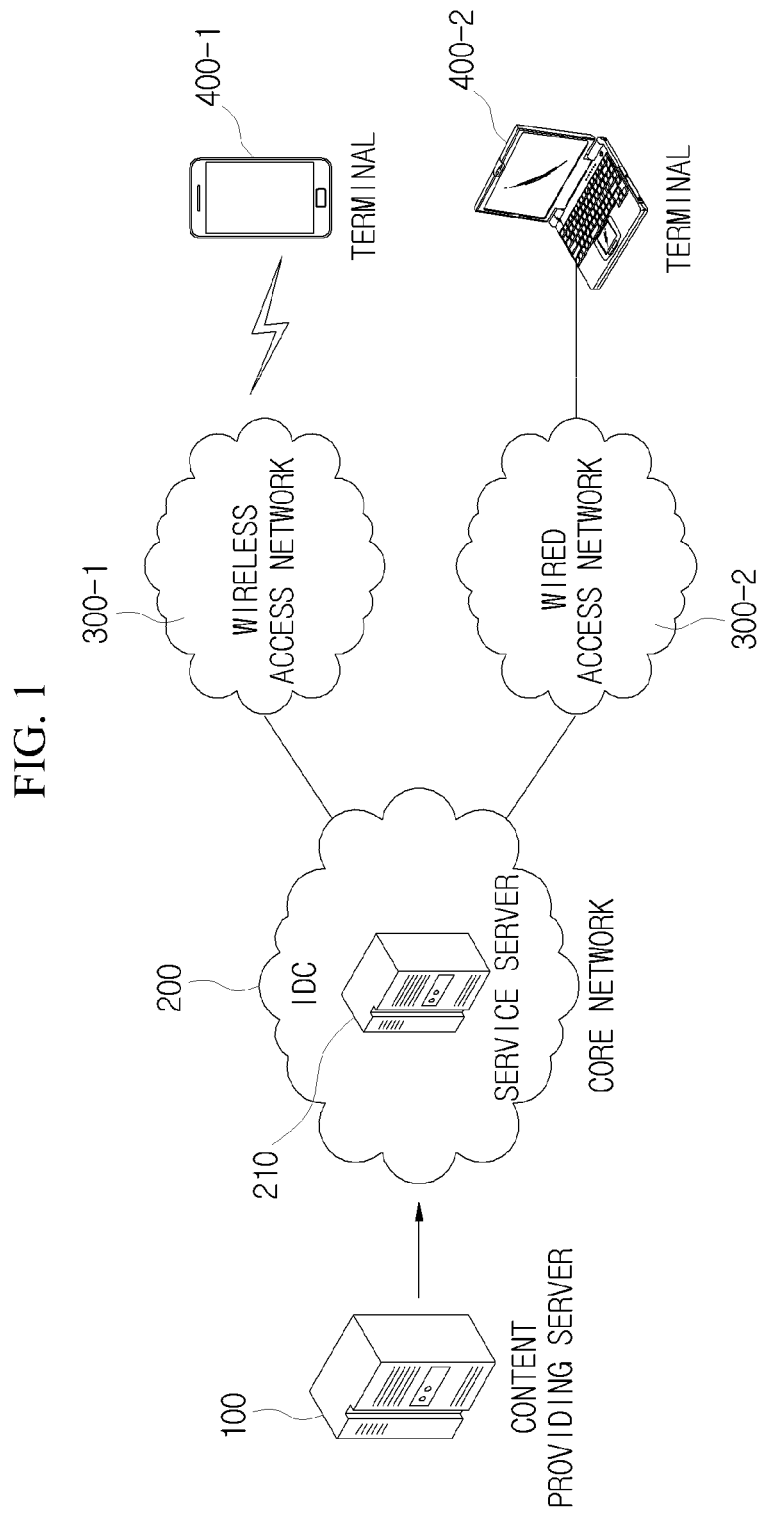
FIG. 1 is a diagram illustrating a content delivery network to which a method of deploying a cache in accordance with an exemplary embodiment of the present invention is applied.

The above and other advantages, and a scheme for the advantages of the present invention will become readily apparent by reference to the following detailed description when considered in conjunction with the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention. The present invention is defined only by the scope of the appended claims. Meanwhile, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail below with reference to the accompanying drawings. The same reference numerals are used to designate the same elements throughout the drawings Descriptions of well-known functions and structures are omitted to enhance clarity and conciseness.

FIG. 1 is a diagram illustrating a content delivery network to which a method of deploying a cache in accordance with an exemplary embodiment of the present invention is applied.

Referring to FIG. 1, a method of deploying a cache in accordance with an exemplary embodiment of the present invention is achieved based on a core network 200, a content providing server 100 connected through a wireless access network 300-1 or a wired access network 300-2, a service server 210, and terminals 400-1 and 400-2.

The content providing server 100 is a service device for providing certain content, for example, various pieces of content including a video file, an audio file and a web page through network, and the content may be provided in a streaming scheme or a download scheme. For example, the content providing server 100 may be a server device for serving a video-sharing website allowing a user to upload, view and share paid videos or free videos, serving an application store allowing pieces of mobile content to be freely transacted, and serving an IPTV providing broadcasting services through the Internet.

The terminals 400-1 and 400-2 request certain content from the content providing server 100 by connecting to the wireless access network 300-1 or a wired access network 300-2, and receives and uses the content transmitted from the content providing server 100 or the service server 210. The terminals 400-1 and 400-2 may include a desktop PC, a notebook computer, a tablet PC, a smartphone, and a personal digital assistant (PDA), an Internet TV (smart TV), that is, any type of electronic/information communication device having a wireless or wired communication function.

The service server 210 is deployed on the core network 200 in a distributed manner, configured to store content provided by the content providing server 100 temporarily or for a predetermined period of time to provide the terminals 400-1 and 400-2 with the stored content on behalf of the content providing server 100 when the terminals 400-1 and 400-2 request the content. For this, the service server 210 performs a caching operation of copying and storing some or all of the pieces of content provided from the content providing server 100 to the terminals 400-1 and 400-2, by using various caching methods.

Although the service server is illustrated as a single unit thereof according to an exemplary embodiment of the present invention, the service server 210 may be provided as one or more units and deployed on the core network 200 in a distributed manner.

Referring to FIG. 1, a content delivery network may include one or more wireless or wired access networks 300-1 and 300-2 and the core network 200 connecting the wired or wireless access networks 300-1 and 300-2 to each other.

The wireless access network 300-1 represents a subscriber network capable of transmitting and receiving data to/from the terminal 400-1 in various wireless communication schemes, and may include a mobile communication network and Wi-Fi network. The wired access network 300-2 represents a subscriber network capable of transmitting and receiving data to/from the terminal 400-2 while connected to the terminal 400-2 in a wired scheme, and may include a wired access network, such as FTTH in an optical communication scheme.

Figure 2:
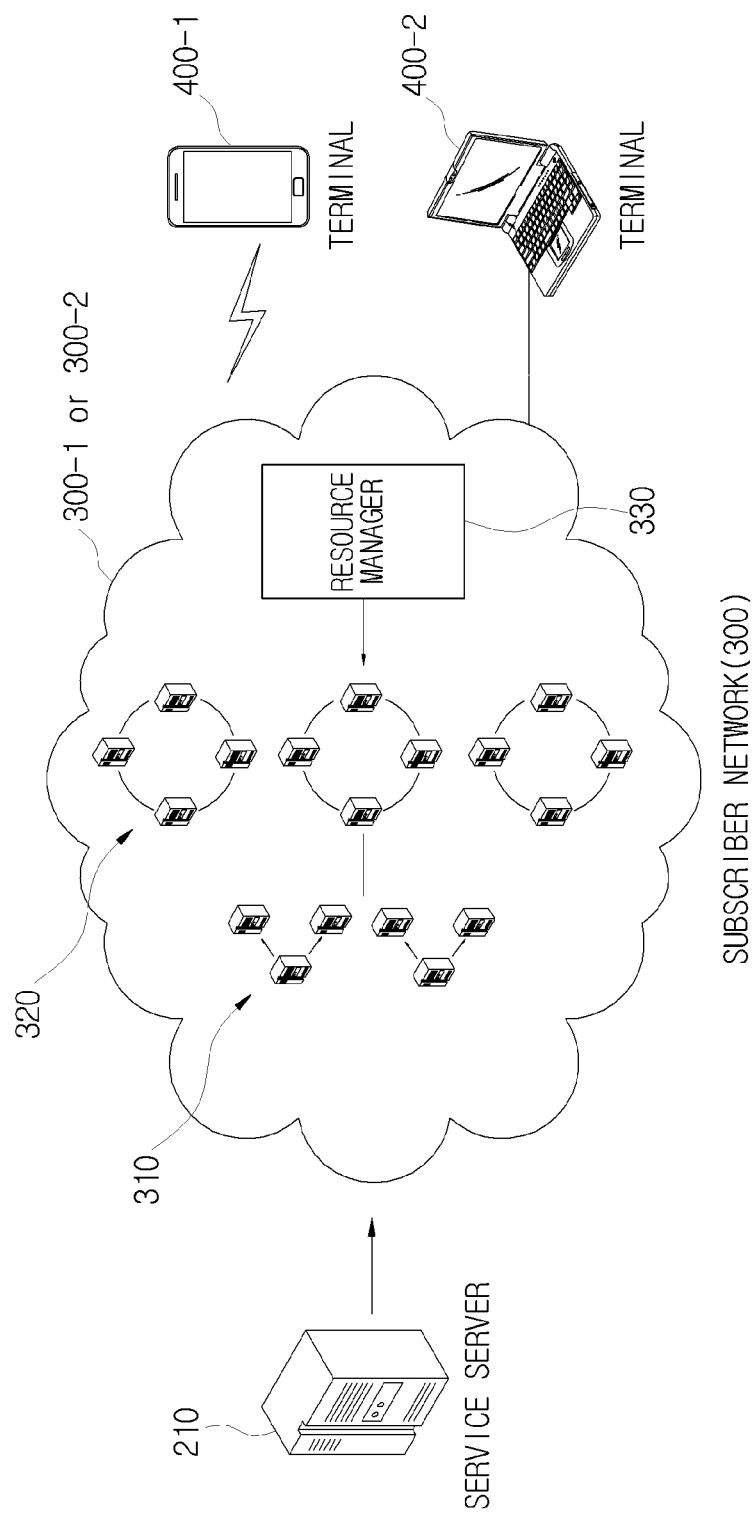
FIG. 2 is a diagram illustrating an example in which a cache deployed at a subscriber network is adaptively deployed in accordance with an exemplary embodiment of the present invention.

FIG. 2 is a diagram illustrating an example in which a cache deployed at a subscriber network is adaptively deployed in accordance with an exemplary embodiment of the present invention.

Referring to FIG. 2, cache service groups 310 and 320 including a plurality of caches deployed in a distributed manner are deployed at the subscriber network 300, and a resource manager 330 transforms a deployment structure of the plurality of caches forming the cache service groups 310 and 320, based on at least one of an increase rate in the number of pieces of content requested by the one or more terminals 400-1 and 400-2 and a reutilization rate for each content.

For example, the cache service groups 310 and 320 may be deployed at an edge node of the core network 200 in a distributed manner. In detail, the cache service groups 310 and 320 may be connected to an edge node connected to the core network 200 and each wireless/wired access network 300-1 and 300-2 through a switching device (for example, a router) to provide a content caching service to the terminal apparatuses 400-1 and 400-2 each connected to one or more wireless/wired access networks 300-1 and 300-2.

The resource manager 330 transforms a deployment structure of the plurality of caches forming the cache service groups 310 and 320, based on at least one of an increase rate in the number of pieces of content requested by the one or more terminals 400-1 and 400-2 and a reutilization rate for each content.

In addition, the resource manager 330 may deploy a plurality of caches forming a cache service group in one of a multi-level structure and a co-caching structure.

In addition, the resource manager 330 deploys a plurality of caches forming a cache service group in a mixed structure including a multi-level structure and a co-caching structure.

FIG. 2 illustrates an example in which a plurality of caches forming a cache service group are deployed in a mixed structure including a multi-level structure and a co-caching structure. In this case, a mixed form of a multi-level structure 310 and a co-caching structure 320 is designed in such a way that a multi-level structure is implemented by deploying a cache having a larger storage space as an upper level cache and deploying a cache having a superior network performance as a lower level cache, and at a lower 레벨 of the multi-level structure, deploy caches in a co-caching structure in preparation of explosive increase in the number of users, so that the number of caches joining the co-caching group is increased when the number of users is great and the number of caching joining the co-caching group is limited when the number of users is small.

In addition, the resource manager 330 determines a location at which each of the caches is deployed, in consideration of a storage capability and a network performance of each of the plurality of caches forming the cache service groups 310 and 320.

For example, it is possible to form the cache service groups 310 and 320 by using caches having the same capacity, but in the multi-level structure, a cache having a high capacity of storage space may be allowed to join an upper level and a cache having a superior network speed and fast response rather than having a high capacity may be allowed to be deployed at a lower level.

Figure 3:
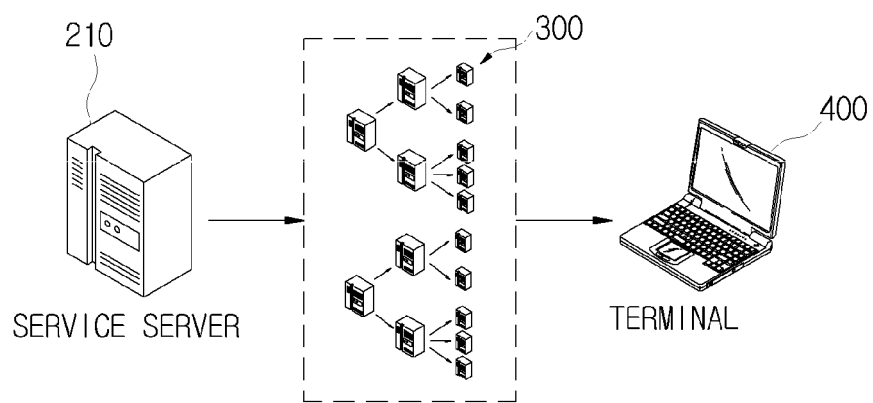
FIG. 3 is a diagram illustrating an example in which a cache deployed at a subscriber network is deployed in a multi-level structure in accordance with an exemplary embodiment of the present invention.

In addition, the resource manager 330 may transform, if the reutilization rate for each content is equal to or larger than a predetermined value, the cache service group from a co-caching structure to a multi-level structure. FIG. 3 is a diagram illustrating an example in which a cache deployed at a subscriber network is deployed in a multi-level structure in accordance with an exemplary embodiment of the present invention.

The deployment structure shown in FIG. 3 corresponds to a cache deployment structure used when services are achieved based on pieces of content having a high reutilization rate, having no cooperation structure through co-caching. Meanwhile, in such a multi-layer structure, an upper level cache includes content included in a lower level cache, so duplication may occur between caches, and thus the resource efficiency may be lowered.

Figure 4:
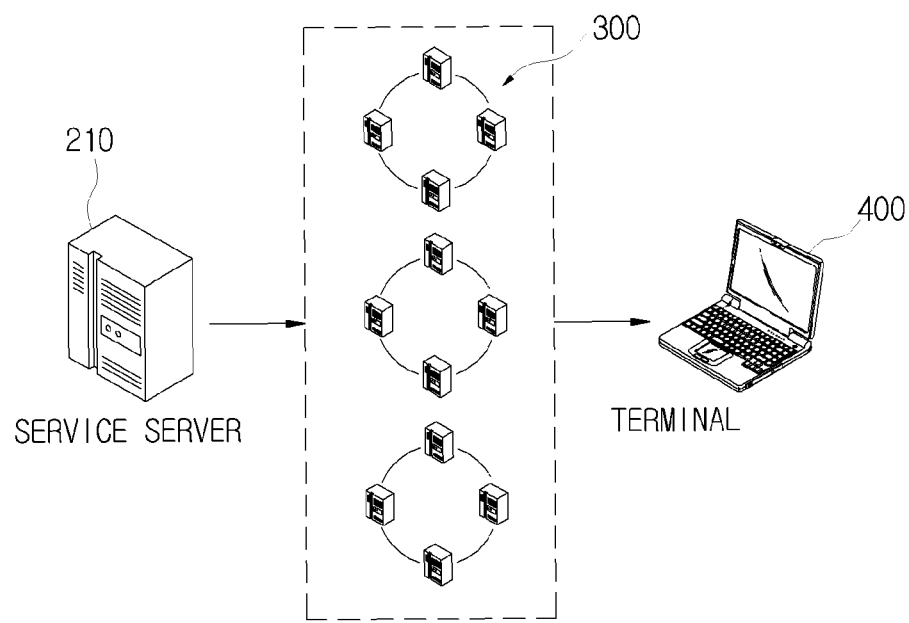
FIG. 4 is a diagram illustrating an example in which a cache deployed at a subscriber network is deployed in a co-caching structure in accordance with an exemplary embodiment of the present invention.

In addition, the resource manager 330 may transform, if the increase rate in the number of pieces of content requested by the one or more terminals 400-1 and 400-2 is equal to or larger than a predetermined value, the cache service group from a multi-level structure to a co-caching structure. FIG. 4 is a diagram illustrating an example in which a cache deployed at a subscriber network is deployed in a co-caching structure in accordance with an exemplary embodiment of the present invention.

The deployment structure shown in FIG. 4 corresponds to a cache deployment structure capable of adaptively responding explosive demands of users when various pieces of content are serviced and the number of users is not constant. In the co-caching scheme, duplication of pieces of content does not occur, but there is an overhead taken to share distributed caches and rearrange the caches for providing services.

Hereinafter, a method of adaptively deploying a cache deployed at a subscriber network in accordance with an exemplary embodiment of the present invention is described with reference to FIGS. 5 and 6.

Figure 5:
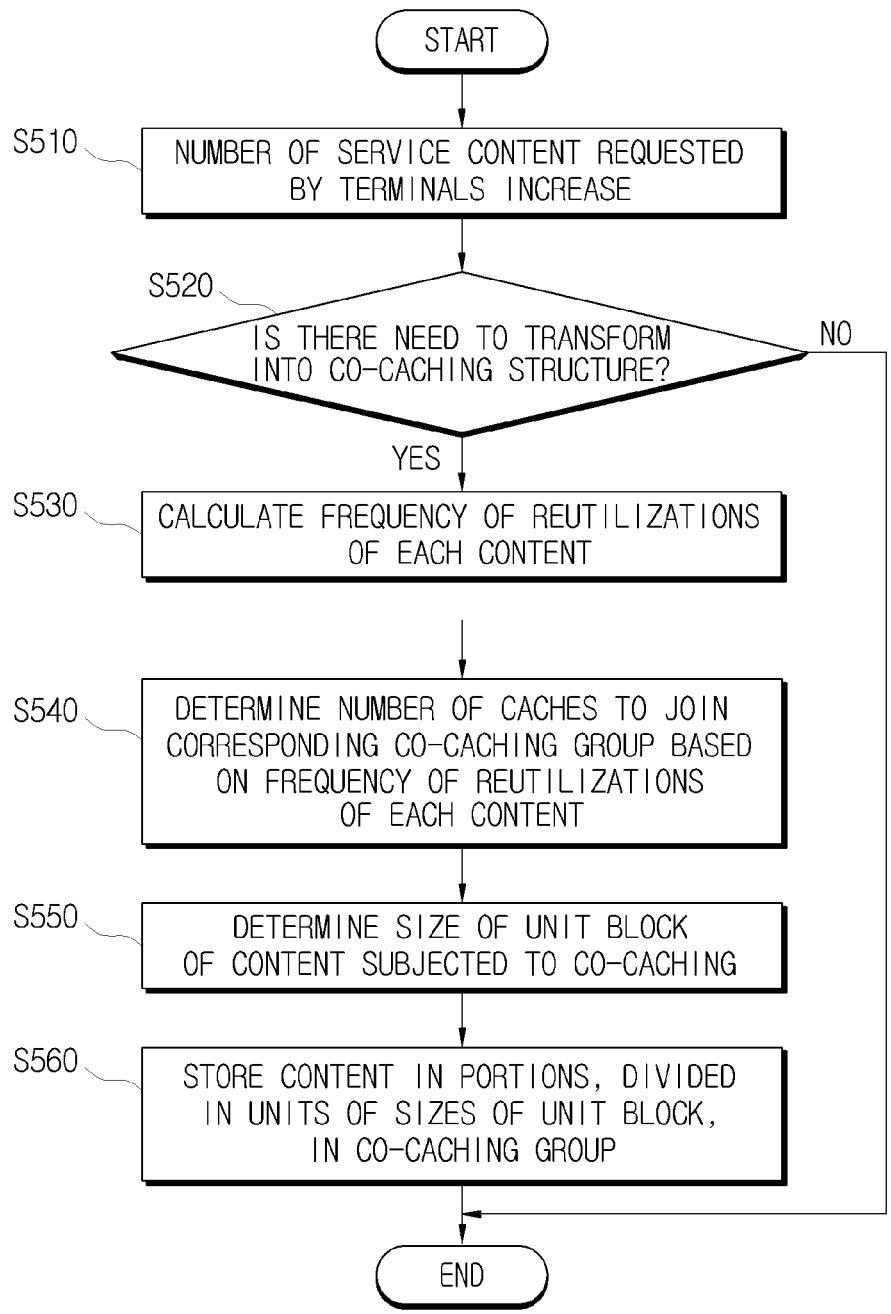
FIG. 5 is a diagram illustrating a process of changing a cache service group from a multi-level structure to a co-caching structure in accordance with an exemplary embodiment of the present invention.

FIG. 5 is a diagram illustrating a process of changing a cache service group from a multi-level structure to a co-caching structure in accordance with an exemplary embodiment of the present invention.

Referring to FIG. 5, if the number of pieces of content requested by terminals is increased (S510), the resource manager 330 determines whether to transform the cache service group from a multi-level structure to a co-caching structure based on an increase rate in the number of pieces of content (S520).

For example, the resource manager 330 compares the increase rate in the number of pieces of content with a predetermined value, and if it is determined in the comparison that the increase rate in the number of pieces of content is equal to or larger than the predetermined value, the resource manager 330 determines that the cache service group needs to be transformed from a multi-level structure to a co-caching structure.

If it is determined in operation 520 that the cache service group needs to be transformed from a multi-level structure to a co-caching structure, the resource manager 330 calculates the frequency of reutilizations for each content (S530), and determines the number of caches to join the co-caching group based on the frequency of reutilizations for each content (S540).

Thereafter, the resource manager 330 determines the size of a unit block of content that is subjected to the co-caching, based on the number of caches to join the co-caching group (S550).

The resource manager 330 divides the service content in units of sizes of the unit block, and stores divided portions of the service content in the caches joining the cache service group. (S560).

FIG. 6 is a diagram illustrating a process of changing a cache service group from a co-caching structure to a multi-level structure in accordance with an exemplary embodiment of the present invention.

Referring to FIG. 6, if the frequency of reutilizations of pieces of service content requested by the terminals is increased (S610), the resource manager 330 determines whether to transform the cache service group from a co-caching structure to a multi-level structure based on the frequency of reutilizations of pieces of service content (S620).

For example, the resource manager 330 compares the frequency of reutilizations of each content with a predetermined value, and if it is determined in the comparison that the frequency of reutilizations of pieces of service content is equal to or larger than the predetermined value, the resource manager 300 determines that the cache service group needs to be transformed from a co-caching structure to a multi-level structure.

If it is determined in operation 620 that the cache service group needs to be transformed from a co-caching structure to a multi-level structure, the resource manager 330 calculates the frequency of reutilizations for each content (S630), and based on the frequency of reutilizations for each content, determines the number of caches to join the multi-level caching group (S640).

Thereafter, the resource manager 330 determines the number of caches to join each level of the multi-level caching group (S650), and determines caches to join an upper level and caches to join a lower lever based on resource circumstance of the caches (S660).

As is apparent from the above, the present invention relates to a plan to effectively deploy a cache that is deployed at a subscriber network, and suggests a cooperation structure unifying the conventional multi-level scheme and the conventional co-caching.

In the cooperation structure, the cache structure is dynamically transformed depending on a real time network circumstance, so that an adaptive transformation is made to the optimum cache structure, thereby enhancing operation efficiency. In particularly, a cache service group is formed in a partial multi-level/co-caching structure in consideration of the storage space, the memory, the CPU, the network performance, and the types of caches, thereby providing the scalability on the cache deployment.

Accordingly, the content reutilization in a cache deployed forward can be increased, and the utilization rate of unused resources in a cache can be increased.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A system for adaptively deploying a plurality of caches positioned at a subscriber network, the system comprising:
    a cache service group including a plurality of caches that are configured to store all or a part of pieces of content serviced from one or more content providing apparatuses to one or more terminals, wherein the plurality of caches are deployed at a subscriber network between the content providing apparatus and the terminal in a distributed manner; and
    a resource manager configured to transform a deployment structure of the plurality of caches forming the cache service group from a multi-level structure to a co-caching structure, based on an increase rate in the number of pieces of content requested by the one or more terminals, and to transform a deployment structure of the plurality of caches forming the cache service group from a co-caching structure to a multi-level structure, based on a reutilization rate for each piece of content requested by the one or more terminals.

2. The system of claim 1, wherein the resource manager determines a location at which each of the caches is deployed, in consideration of a storage capability and a network performance of each of the plurality of caches forming the cache service group.

3. The system of claim 1, wherein the cache service group comprises a parent cache group having a multi-level structure and an edge cache group having a co-caching structure, and the edge cache group is connected to a lowest layer of the parent cache group.

4. The system of claim 1, wherein the resource manager transforms, if the increase rate in the number of pieces of content requested by the one or more terminals is equal to or larger than a predetermined value, the cache service group from a multi-level structure to a co-caching structure.

5. The system of claim 1, wherein the resource manager transforms, if the reutilization rate for each content is equal to or larger than a predetermined value, the cache service group from a co-caching structure to a multi-level structure.

6. A method of adaptively deploying a cache positioned at a subscriber network in a system comprising: a cache service group configured to store all or a part of pieces of content serviced from one or more content providing apparatuses to one or more terminals, and including a plurality of caches deployed at a subscriber network between the content providing apparatus and the terminal in a distributed manner; and a resource manager configured to transform a deployment structure of the plurality of caches forming the cache service group, the method performed by the resource manager comprising:
    transforming the plurality of caches forming the cache service from a multi-level structure to a co-caching structure, based on an increase rate in the number of pieces of content requested by the one or more terminals, and from a co-caching structure to a multi-level structure, based on a reutilization rate for each piece of content requested by the one or more terminals.

7. The method of claim 6, wherein the deploying of the plurality of caches comprises
    transforming, if the increase rate in the number of pieces of content requested by the one or more terminals is equal to or larger than a predetermined value, the cache service group from a multi-level structure to a co-caching structure.

8. The method of claim 7, wherein the transforming of the cache service group comprises:
    calculating a reutilization rate for each content;
    determining the number of caches to join the cache service group based on the reutilization rate for each content; and
    determining a size of a unit block of service content based on the number of the caches; and
    dividing the service content in units of the sizes of the unit block, and storing divided portions of the service content in the caches joining the cache service group.

9. The method of claim 6, wherein the deploying of the plurality of caches comprises
    transforming, if the reutilization rate for each content is equal to or larger than a predetermined value, the cache service group from a co-caching structure to a multi-level structure.

10. The method of claim 9, wherein the transforming of the cache service group comprises:
 calculating a reutilization rate for each content;
 determining the number of levels of the multi-level structure and the number of caches to join each level, based on the reutilization rate for each content; and
 determining a location at which each of the caches is deployed, in consideration of a storage capability and a network performance of each of the caches.

* * * * *